Figure 1:
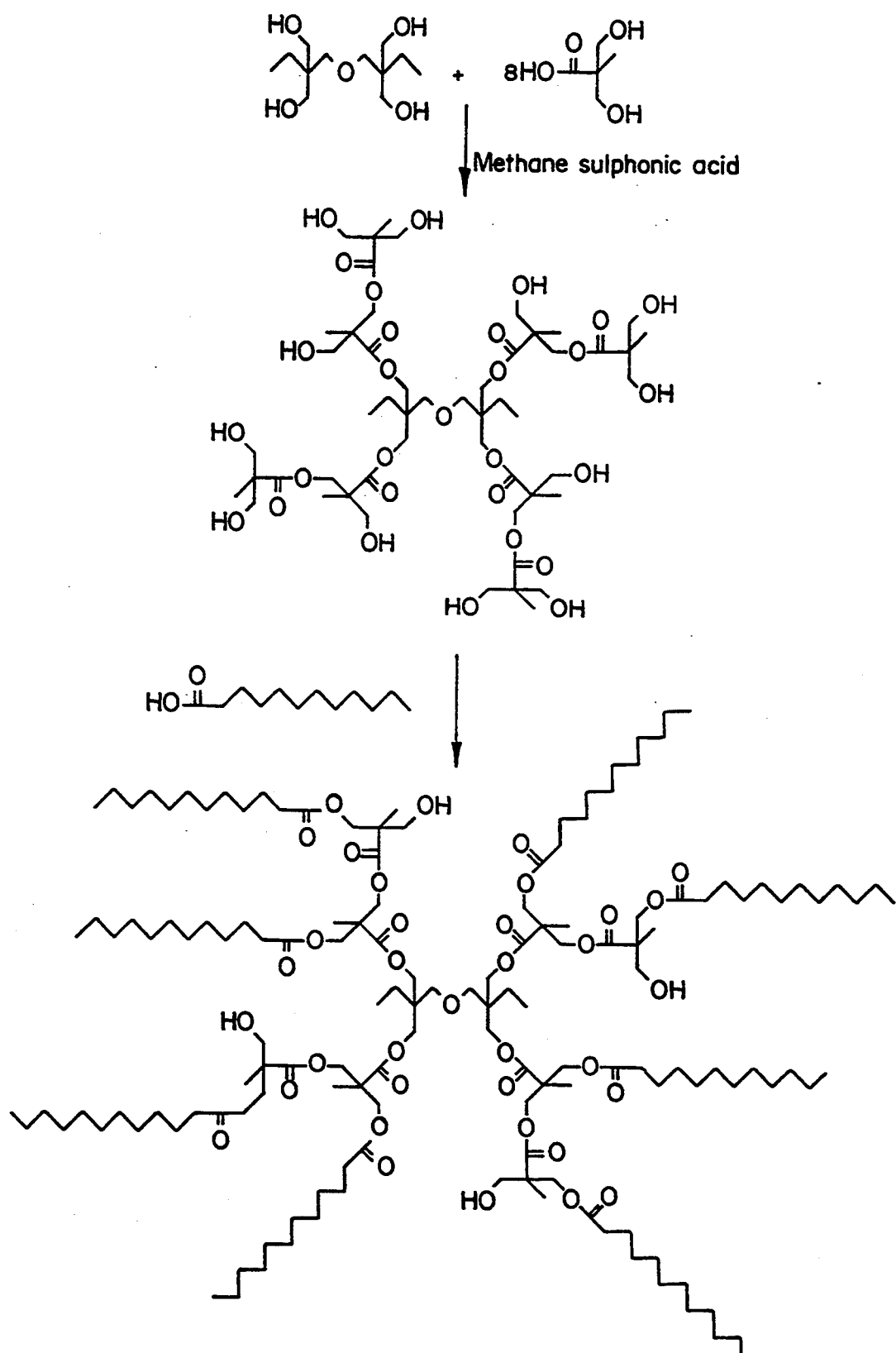

United States Patent [19]

Hult et al.

[11] Patent Number: 5,418,301

[45] Date of Patent: May 23, 1995

[54] DENDRITIC MACROMOLECULE AND PROCESS FOR PREPARATION THEREOF

[75] Inventors: Anders Hult, Täby; Eva Malmstrom, Bandhagen; Mats Johansson, Stockholm; Kent Sörensen, Perstorp, all of Sweden

[73] Assignee: Perstorp AB, Perstorp, Sweden

[21] Appl. No.: 256,493

[22] PCT Filed: Feb. 24, 1993

[86] PCT No.: PCT/SE93/00148

§ 371 Date: Jul. 13, 1994

§ 102(e) Date: Jul. 13, 1994

[87] PCT Pub. No.: WO93/17060

PCT Pub. Date: Sep. 2, 1993

[30] Foreign Application Priority Data

Feb. 26, 1992 [SE] Sweden .............................. 9200564

[51] Int. Cl.$^6$ .............................................. C08F 20/00
[52] U.S. Cl. .................................... 525/437; 528/271;
528/274; 528/279; 528/281; 528/282; 528/283;
528/295.5; 528/300; 528/301; 528/303;
528/306; 525/438; 525/440; 525/442; 525/444;
525/444.5; 525/445; 525/449; 525/450
[58] Field of Search ............... 528/271, 274, 279, 281,
528/282, 283, 295.5, 300, 301, 303, 306;
525/437, 438, 440, 442, 444, 444.5, 445, 450,
449

[56] References Cited

U.S. PATENT DOCUMENTS

| 5,041,516 | 8/1991 | Frechet et al. | 528/44 |
| 5,136,014 | 8/1992 | Figuly | 528/272 |

FOREIGN PATENT DOCUMENTS

3-296514 12/1991 Japan.

OTHER PUBLICATIONS

Tomalia, et al. (1990) "Starburst Dendrimers: Molecular-Level Control of Size, Shape, Surface Chemistry, Topology, and Flexibility from Atoms to Macroscopic Matter", *Angew. Chem. Int. Ed. Engl.* 29:138–175.

*Primary Examiner*—Samuel A. Acquah
*Attorney, Agent, or Firm*—Scully, Scott, Murphy & Presser

[57] ABSTRACT

The invention relates to a dendritic macromolecule of the polyester type comprising a central initiator molecule or initiator polymer having one or more reactive hydroxyl groups (A). The groups (A) are under formation of an initial tree structure bonded to reactive carboxyl groups (B) of a monomeric chain extender having the two reactive groups (A) and (B). The tree structure is optionally extended and further branched from the initiator molecule or initiator polymer by addition of further molecules of a monomeric chain extender by means of bonding between the reactive groups (A) and (B) thereof and is thereafter optionally further extended by reaction with a chain stopper. The invention also comprises a process for preparation of the dendritic macromolecule.

25 Claims, 2 Drawing Sheets

DENDRITIC MACROMOLECULE AND PROCESS FOR PREPARATION THEREOF

This application is a 371 of PCT/SE93/00148 filed Feb. 24, 1993.

The present invention relates to a dendritic macromolecule, comprising composed of a central initiator molecule or initiator polymer having one or more reactive groups (A), which groups (A) under formation of an initial tree structure are bonded to reactive carboxyl groups (B) of a monomeric chain extender containing the two reactive groups (A) and (B). The tree structure is optionally extended and further branched from the initiator molecule or initiator polymer by an addition of further molecules of a monomeric chain extender by means of bonding between the reactive groups (A) and (B) thereof and is optionally further extended by reaction with a chain stopper.

The invention also comprises a process for preparation of the dendritic macromolecule.

Various dendritic macromolecules, so called dendrimers are by Tamalia et al described in Angew. Chem. Int. Ed. Engl. 29 pages 138-175 (1990). The macromolecules hold a tree structure.

Products quite different from the present invention are in said publication described, which publication discloses the preparation of polyamide amines of the dendrimer type. As initiator molecule are $NH_3$ used and as chain extender methyl acrylate and ethylene diamine. The yielded macromolecules are $NH_2$ terminated. Chain stoppers are, according to this process, not used.

However, the present invention refers to a dendritic, that is a hyperbranched, macromolecule of the polyester type.

Ordinary polyesters are well-known and have been manufactured for a very long time. They exhibit many good properties but are also submitted to some drawbacks, which until now have been regarded as impossible to avoid.

An alkyd is a typical example of a polyester type having a very large commercial significance. Alkyds are normally used as components in paint binders.

The composition of an alkyd can be illustrated by the following structural formula

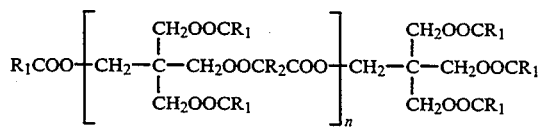

where
$R_1$ is the alkyl moiety of an unsaturated fatty acid of such a type that it is reactive to air oxygen thereby providing the polyester with air drying properties
$R_2$ is the alkyl or aryl moiety of a difunctional carboxylic acid
n is the average degree of polymerisation.

An alkyd is most often a high molecular and randomly branched compound with a broad dispersivity, which not is illustrated by above simplified formula. An alkyd exhibits due to this a very high viscosity and large amounts of solvents must thus be added to obtain so low a viscosity that it can be utilised.

Further examples are so called conventional polyesters. They are in principal composed similar to above structural formula, but with the difference that $R_1$ is the alkyl moiety of a saturated monofunctional acid and that some of the alcohol moieties in the chain are unesterified, i.e. the polyesters contain unreacted hydroxyl groups. Curing is performed by a crosslinking between the unreacted hydroxyl groups and e.g. a melamine resin. The demand for viscosity reducing solvents is to obtain applicable lacquers in this case also very high.

According to the present invention above drawbacks have quite unexpectedly been avoided and a hyperbranched macromolecule of the dendrimer type has been brought about. The dendritic macromolecule according to the invention comprises a central initiator molecule or initiator polymer having one or more reactive groups (A), which groups (A) under formation of an initial tree structure are bonded to reactive groups (B) of a monomeric chain extender holding the two reactive groups (A) and (B), which tree structure optionally is extended and further branched from the initiator molecule or initiator polymer by an addition of further molecules of a monomeric chain extender through bonding between the reactive groups (A) and (B) thereof. The tree structure is optionally further extended by reaction with a chain stopper. The macromolecule is characterised in that the reactive groups (A) and (B) are hydroxyl groups (A) and carboxyl groups (B), respectively, and that the chain extender has at least one carboxyl group (B) and at least two hydroxyl groups (A) or hydroxyalkyl substituted hydroxyl groups (A).

An alkyd having a high molecular weight, as necessary to give good performance characteristics, as well as having so low a viscosity that the alkyd can be used solventless or with only a very small addition of solvents, is obtained when an alkyd is formulated as a dendrimer in accordance with the present invention. An alkyd, which at room temperature is liquid although the molecular weight is very high, can be prepared. Such alkyds are very easy to emulsify in water. A sufficiently hard film is obtained after air drying, provided unsaturated fatty acids or other autoxidatively drying compounds are used as chain stoppers. Naturally, the invention gives due to above great advantages from an environmental point of view.

The central initiator molecule or initiator polymer can suitably consist of
a) an aliphatic, a cycloaliphatic or an aromatic diol
b) a triol
c) a tetrol
d) a sugar alcohol such as sorbitol and mannitol
e) anhydroennea-heptitol or dipentaerythritol
f) an α-alkylglucoside such as α-methylglucoside
g) a monofunctional alcohol
h) an alkoxylate polymer having a molecular weight of at most 8000 and which is produced by a reaction between an alkylene oxide or a derivative thereof and one or more hydroxyl groups from any of the alcohols selected from any of the sections a) through g).

The in section a) disclosed diols can be of several different types. They can, thus, be linear having the formula

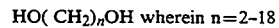

Diols of above type are for instance 1,3-propanediol, 1,2-ethanediol, 1,4-butanediol, 1,5-pentanediol, 1,6-hexanediol and polytetrahydrofuran.

The diols can also be branched as for instance dimethylolpropane, neopentyl glycol, 2-propyl-2-methyl-1,3-propanediol, 2-butyl-2-ethyl-1,3-propanediol, 2,2-diethyl-1,3-propanediol, 1,2-propanediol, 1,3-butanediol, 2,2,4-trimethylpentane-1,3-diol, trimethylhexane-1,6-diol, 2-methyl-1,3-propanediol, diethylene glycol, triethylene glycol, polyethylene glycols, dipropylene glycol, tripropylene glycol and polypropylene glycols.

Cycloaliphatic diols such as cyclohexane dimethanol and cyclic formals of pentaerythritol as for instance 1,3-dioxane-5,5-dimethanol can, furthermore, be used.

Aromatic diols, for instance 1,4-xylylene glycol and 1-phenyl-1,2-ethanediol, as well as reaction products of polyfunctional phenolic compounds and alkylene oxides or derivatives thereof, can furthermore be employed. Bisphenol A, hydroquinone and resorcinol are examples of suitable phenolic compounds.

Diols of the ester type, for example neopentylhydroxypivalate, are also suitable diols.

As substitute for a 1,2-diol can corresponding 1,2-epoxide or an α-olefine oxide be used.

A general formula for 1,2-epoxides can be given as

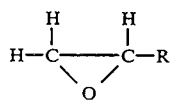

wherein R is H, $CH_3 \ldots C_nH_{2n+1}$ or

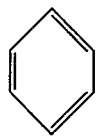

and $n \geq 2$

Ethylene oxide, propylene oxide, 1,2-butylene oxide and styrene oxide can serve as examples of such compounds.

The under section b) mentioned triols can as the diols be of various types. The general formula can be

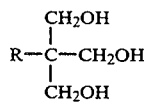

wherein R is $C_nH_{2n+1}$ and $n \leq 24$.

R can be a linear or branched alkyl moiety. Trimethylolpropane, trimethylolethane, trimethylolbutane, 3,5,5-trimethyl-2,2-dihydroxymethylhexane-1-ol are examples of this type of triols.

A further kind of suitable triols are those having two types of hydroxyl groups, primary as well as secondary hydroxyl groups, as for instance glycerol and 1,2,6-hexanetriol. It is also possible to use cycloaliphatic and aromatic triols and/or corresponding adducts with alkylene oxides or derivatives thereof.

Tetrols as mentioned under section c) above can comprise for example pentaerythritol, ditrimethylolpropane, diglycerol and ditrimethylolethane. It is also possible to use cycloaliphatic and aromatic tetrols as well as corresponding adducts with alkylene oxides or derivatives thereof.

Chain extenders used according to the invention can suitably consist of
a) a monofunctional carboxylic acid having at least two hydroxyl groups.
b) a monofunctional carboxylic acid having at least two hydroxyl groups wherein one or more of the hydroxyl groups are hydroxyalkyl substituted.

The chain extender can advantageously comprise α,α-bis(hydroxymethyl)-propionic acid (dimethylolpropionic acid), α,α-bis-(hydroxymethyl)-butyric acid, α,α,α-tris(hydroxymethyl)-acetic acid, α,α-bis(hydroxymethyl)-valeric acid, α,α-bis(hydroxy)propionic acid or α-phenylcarboxylic acids having at least two hydroxyl groups directly pendant to the phenyl ring (phenolic hydroxyl groups) such as 3,5-dihydroxybenzoic acid.

Above acids wherein one or more of the hydroxyl groups are hydroxyalkyl substituted, can possibly also be used as chain extenders.

The dendritic macromolecule can in certain cases also contain a chain stopper, which advantageously is selected among compounds from one or more of the following sections
a) a saturated monofunctional carboxylic acid or a saturated fatty acid or an anhydride thereof
b) an unsaturated fatty acid
c) an unsaturated monofunctional carboxylic acid
d) a diisocyanate or an oligomer thereof
e) an adduct of a reaction product formed by means of a compound according to section d)
f) a difunctional or a polyfunctional carboxylic acid or an anhydride thereof
g) an adduct of a reaction product formed by means of a compound according to section f)
h) an aromatic monofunctional carboxylic acid such as benzoic acid and para-tert.butylbenzoic acid
i) an epihalohydrin such as 1-chloro-2,3-epoxy propane and 1,4-dichloro-2,3-epoxy butane
j) a glycidyl ester of a monofunctional carboxylic acid or of a fatty acid, which acids hold 1–24 carbon atoms
k) an epoxide of an unsaturated fatty acid with 3–24 carbon atoms such as epoxidized soybean fatty acid The terminal hydroxyl groups in the chain of the macromolecule can of course to a larger or smaller extent be reacted with a chain stopper. Important aspects on the use and choice of chain stoppers are for instance created by the desired properties of the prepared macromolecule.

The choice of chain stopper is particularly important with regard to adjusting the properties of the macromolecule. A certain chain stopper is normally used for a certain application area, while other application areas employ other chain stoppers.

A chain stopper according to section a) above, comprising a saturated monofunctional carboxylic acid or a fatty acid, is described by the following general formula R—COOH wherein R is $C_nH_{2n+1}$ and $n \leq 32$.

Above carboxylic or fatty acid can be linear or branched and can be employed as acid or, where applicable, as anhydride. Examples are acetic acid, propionic acid, butyric acid, valeric acid, isobutyric acid, trimethylacetic acid, caproic acid, caprylic acid, heptanoic acid, capric acid, pelargonic acid, lauric acid, myristic acid, palmitic acid, stearic acid, behenic acid, lignoceric acid, ceratic acid, montanoic acid, isostearic acid, isononanoic acid and 2-ethylhexanoic acid.

According to section b) above, the chain stopper can be an unsaturated fatty acid as for instance oleic acid, ricinoleic acid, linoleic acid, linolenic acid, erucic acid, soybean fatty acid, linseed fatty acid, dehydrated castor fatty acid, tall oil fatty acid, tung oil fatty acid, sunflower fatty acid and safflower fatty acid.

An unsaturated monofunctional carboxylic acid, in accordance with section c) above, can also be used as chain stopper. Examples of such acids are acrylic acid and metacrylic acid.

Section d) above has bearing on the use of diisocyanates and oligomers thereof as chain stoppers. Compounds belonging to this section can be exemplified by toluene-2,4-diisocyanate, toluene-2,6-diisocyanate, diphenylmethane diisocyanate, hexamethylene diisocyanate, isophorone diisocyanate, 4,4-diisocyanato-dicyclohexylmethane, 1,5-diisocyanatonaphthaline, 1,4-phenylene diisocyanate, tetramethyl xylene diisocyanate, 1-isocyanato-3,3,5-trimethyl-5-isocyanatomethylcyclohexane, 1,4-diisocyanate cyclohexane, 1,3-diisocyanate benzene and 1,4-diisocyanate benzene.

Adducts prepared from reaction products formed by means of a component from section d) above can, furthermore, be used as chain stoppers in accordance with section e). Chain stoppers of this kind are for instance adducts with hydroxyethyl acrylate and hydroxypropyl acrylate, trimethylolpropane diacrylate, pentaerythritol diacrylate, pentaerythritol triacrylate and corresponding acrylates of alkoxylated trimethylolpropane and pentaerythritol, respectively. Further examples are adducts with hydroxysubstituted allyl ethers such as trimethylolpropane diallyl ether and pentaerythritol triallyl ether.

Polyfunctional carboxylic acids and/or corresponding anhydrides are as disclosed in section f) above also suitable as chain stoppers and can be exemplified by maleic anhydride, fumaric acid, orthophthalic anhydride, terephthalic acid, isophthalic acid, adipic acid, azelaic acid, sebacic acid, tetrahydrophthalic anhydride, hexahydrophthalic anhydride, succinic acid and trimellitic anhydride.

Adducts prepared from reaction products formed by means of a component from section f) can, according to section g) above, be used as chain stoppers. Examples are i.a. adducts of hydroxysubstituted allyl ethers such as adducts of trimethylolpropane monoallyl ether, trimethylolpropane diallyl ether, pentaerythritol triallyl ether and glycerol monoallyl ether.

Epihalohydrins as disclosed in section i) above can suitably be used as chain stoppers, thus yielding epoxy functional dendritic macromolecules.

A glycidyl ester of a monofunctional carboxylic acid or of a fatty acid, which acids hold 1–24 carbon atoms, can according to section j) above, be used as chain stoppers. Such compounds can be exemplified by 1,2-epoxy-3-allyloxypropane, 1-allyloxy-2,3-epoxypropane, 1,2-epoxy-3-phenoxypropane and 1-glycidyloxy-2-ethylhexane.

Epoxy functional dendrimers can, also, be prepared through epoxidation of an unsaturation which is incorporated in the terminated dendrimer, for example a fatty acid unsaturation.

It is also possible to use adducts of such epoxy compounds as glycidyl ether of bisphenol A and oligomers thereof.

The present invention also comprises a process for preparation of a dendritic macromolecule as disclosed above. The process is characterised in that an initiator molecule or an initiator polymer having one or more hydroxyl groups are reacted at a temperature of 0°–300° C. such as 50°–280° C., preferably 100°–250° C., with a chain extender having one carboxyl group and at least two hydroxyl groups or hydroxyalkyl substituted hydroxyl groups. The reaction product obtained is thereafter potentially reacted with a chain stopper.

The molar ratio between the number of moles used chain extender per mole hydroxyl groups originating from the initiator molecule or initiator polymer is suitably to be found between 1:1 and 2000:1, preferably between 1:1 and 1100:1. In certain cases the ratio is between 1:1 and 500:1 such as between 1:1 and 100:1.

It is advisable to continuously remove water formed during the reaction. Suitable methods are for instance inlet of an inert gas into the reaction vessel, vacuum distillation, azeotropic distillation or the like.

The reaction can be carried out without using any catalyst. An ordinary esterification catalyst is, however, used in many cases and is then suitably selected among a) a Bronstedt acid such as naphthalene sulphonic acid, para-toluene sulphonic acid, methane sulphonic acid, trifluoromethane sulphonic acid, trifluoroacetic acid, sulphuric acid or phosphoric acid b) a Lewis acid such as $BF_3$, $AlCl_3$, $SnCl_4$ c) a titanate as tetrabutyl titanate d) zinc powder or an organozinc compound e) tin powder or an organotin compound The initial step is preferably performed in the presence of an acid catalyst and the product thus obtained can, if necessary, be neutralised prior to a reaction with a chain stopper.

Initiator molecules or polymers as well as chain extenders used in the process according to the invention are disclosed above.

Potential chain stoppers used in the process according to the invention are also disclosed above.

The initiator molecule consists, at a preferred embodiment of the process according to the invention, of ditrimethylolpropane, ditrimethylolethane, dipentaerythritol, pentaerythritol, alkoxylated pentaerythritol, trimethylolethane, trimethylolpropane, alkoxylated trimethylolpropane, glycerol, neopentyl glycol, dimethylolpropane or 1,3-dioxane-5,5-dimethanol. The chain extender consists, at this preferred embodiment of dimethylolpropionic acid, $\alpha,\alpha$-bis(hydroxymethyl)-butyric acid, $\alpha,\alpha,\alpha$-tris(hydroxymethyl)-acetic acid, $\alpha,\alpha$-bis(hydroxymethyl)-valeric acid, $\alpha,\alpha$-bis(hydroxy)-propionic acid or 3,5-dihydroxybenzoic acid.

The initiator molecule consists, at an especially preferred embodiment of the process according to the invention, of ditrimethylolpropane, trimethylolpropane, ethoxylated pentaerythritol, pentaerythritol or glycerol while the chain extender consists of dimethylolpropionic acid.

The invention also refers to the use of a dendritic macromolecule according to above as component in applications such as alkyds, alkyd emulsions, saturated polyesters, unsaturated polyesters, epoxy resins, phenolic resins, polyurethane resins, polyurethane foams and elastomers, binders for radiation curing systems such as systems cured with ultra-violet (UV) and infra-red (IR) light or electron-beam (EB), dental materials, adhesives, synthetic lubricants, microlithographic paints, binders for powder systems, amino resins, composites reinforced with glass, aramid or carbon/graphite fibres and moulding compounds based on urea-formaldehyde resins, melamineformaldehyde resins or phenol-formaldehyde resins.

The invention is further explained in connection to below embodiment Examples, of which Examples 1-12 and 15-52 refer to preparations and evaluations of various dendritic products within the scope of the invention, while Examples 13 and 14 are comparative experiments related to conventional products beyond the scope of the invention.

The embodiment Examples disclose as follows

Examples 1-7, 27-30 and 48: Preparations of polyesters based on various initiator molecules and dimethylolpropionic acid.

Examples 8-12, 31-34, 42 and 49: Preparations of alkyds based on polyesters, prepared according to preceding Examples, and unsaturated fatty acids.

Examples 13 and 14: Preparations of conventional alkyds. These Examples are comparative experiments beyond the scope of the present invention.

Examples 15, 17, 22-23, 25-26, 43 and 47: Lacquer formulations and evaluations of products according to preceding Examples.

Examples 16, 18, 37 and 38: Functionalization of polyesters, prepared according to preceding Examples, with mixtures of capric and caprylic acid.

Example 19: Preparation of an intermediate product intended to be used in Examples 20 and 21.

Examples 20 and 21: Preparations of unsaturated polyesters based on i.a. the intermediate product prepared according to Example 19.

Examples 24, 39 and 40: Preparations of acrylates based on products prepared according to preceding Examples.

Examples 35 and 36: Preparations of alkyd emulsions based on alkyds prepared according to Examples 29 and 30.

Examples 41 and 50: Preparations of epoxy resins based on products according to Examples 37 and 49.

Example 51: Preparation and stuctural characterisation of a 9 generations dendritic polyester. Characterisation by the Mark-Houwink constant.

Example 52: Preparation of a polyurethane dispersion.

Evaluation results with reference to Examples above are given in Tables 1-7, of which Table 1 gives results from Examples 1-7.
Table 2 gives results from Examples 8-14.
Table 3 gives results from Examples 20-21.
Table 4 gives results from Examples 22-23.
Table 5 gives results from Example 24.
Table 6 gives results from Examples 39-40.
Table 7 gives results from Examples 31-36.

Figure 2:
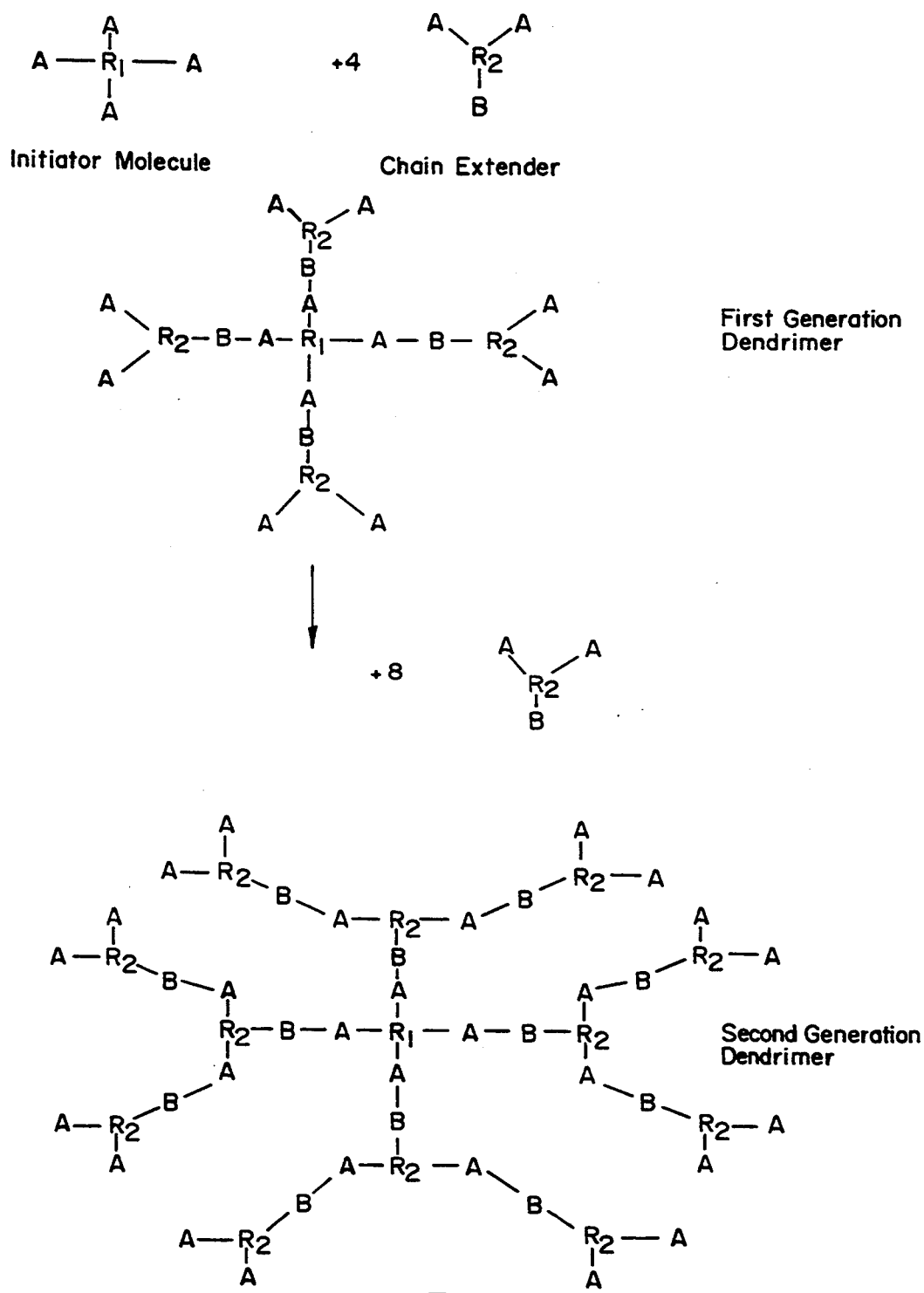

The invention is also illustrated by the enclosed FIGS. 1 and 2, of which

FIG. 1 gives a general outline of a reaction between an initiator molecule of ditrimethylolpropane and a chain extender of dimethylolpropionic acid forming a 1.5 generation dendrimer. A chain stopper consisting of lauric acid is thereafter added in a final reaction step. The initial step is performed using methane sulphonic acid as catalyst.

FIG. 2 gives a general outline of a 2 generations dendrimer prepared by a reaction between an initiator molecule holding four hydroxyl groups A and a chain extender with two hydroxyl groups A and one carboxyl group B. The reaction can, of course, be further continued and hence the molecule chains be still more branched.

EXAMPLE 1

1.0 mole of ditrimethylolpropane was charged in a 4-necked reaction flask equipped with a stirrer, argon inlet, a thermometer and a cooler for water separation. The temperature was raised to 120° C. and 8.0 moles of dimethylolpropionic acid together with 0.12 mole of para-toluene sulphonic acid were added. The temperature was thereafter raised to 140° C. and a stream of argon was allowed to pass through the reaction flask in order to remove formed reaction water. After 2 hours, 8.0 moles of lauric acid were charged and the reaction was allowed to continue for a further 2 hours.

The viscosity of obtained polyester was 10 Pas at 23° C. Further properties are given in Table 1.

EXAMPLE 2

The procedure according to Example 1 was repeated with the difference that 4.0 moles of lauric acid instead of 8.0 moles were charged.

The viscosity of obtained polyester was 1037 Pas at 23° C. Further properties are given in Table 1.

EXAMPLE 3

The procedure according to Example 1 was repeated with the difference that 12.0 moles of lauric acid instead of 8.0 moles were charged.

The viscosity of obtained polyester was 1.5 Pas at 23° C. Further properties are given in Table 1.

EXAMPLE 4

The procedure according to Example 1 was repeated with the difference that 4.0 moles of dimethylolpropionic acid instead of 8.0 moles and that 5.33 moles of lauric acid instead of 8.0 moles were charged.

The viscosity of obtained polyester was 3.9 Pas at 23° C. Further properties are given in Table 1.

EXAMPLE 5

The procedure according to Example 1 was repeated with the difference that 4.0 moles of dimethylolpropionic acid instead of 8.0 moles were charged.

The viscosity of obtained polyester was 0.73 Pas at 23° C. Further properties are given in Table 1.

EXAMPLE 6

The procedure according to Example 1 was repeated with the difference that 12.0 moles of dimethylolpropionic acid instead of 8.0 moles and that 10.67 moles lauric acid instead of 8.0 moles were charged.

The viscosity of obtained polyester was 18.4 Pas at 23° C. Further properties are given in Table 1.

EXAMPLE 7

The procedure according to Example 1 was repeated with the difference that 12.0 moles of dimethylolpropionic acid instead of 8.0 moles and that 16.0 moles lauric acid instead of 8.0 moles were charged.

The viscosity of obtained polyester was 2.6 Pas at 23° C. Further properties are given in Table 1.

EXAMPLE 8

1.0 mole of ditrimethylolpropane was charged in a 4-necked reaction flask equipped with a stirrer, nitrogen inlet, a thermometer and a cooler for water separation.

The temperature was raised to 120° C. and 8.0 moles of dimethylolpropionic acid together with 10.7 g of methane sulphonic acid were added. The temperature was thereafter raised to 140° C. and maintained until the water distillation had ceased. A vacuum of 15 mm Hg was thereafter applied for 30 minutes followed by an addition of 8.6 g of Ca(OH)$_2$ for neutralisation of the methane sulphonic acid. After 15 minutes, 10.0 moles of soybean fatty acid and 3% by weight of xylene were charged (the amount of xylene was calculated on the subtotal of all included components). The temperature was raised to 230° C. and maintained until an acid value of 4.5 mg KOH/g was obtained. A vacuum of 15 mm Hg was thereafter applied to evaporate the xylene.

Obtained alkyd exhibited the following properties:

| | |
|---|---|
| Nonvolatile content | 100% |
| Viscosity at 23° C. | 1160 mpas |
| Gardner colour value | 5 |
| Hydroxyl value | 21 mg KOH/g |
| Molecular weight $M_n$ | 3910 g/mole |
| Molecular weight $M_w$ | 6790 g/mole |
| $M_w/M_n$ = H | 1.7 |

EXAMPLE 9

The procedure according to Example 8 was repeated with the difference that 8.0 moles of soybean fatty acid and that 2.0 moles of benzoic acid were charged instead of 10.0 moles of soybean fatty acid.

Obtained alkyd exhibited the following properties:

| | |
|---|---|
| Nonvolatile content | 100% |
| Viscosity at 23° C. | 2950 mpas |
| Gardner colour value | 6 |
| Hydroxyl value | 32 mg KOH/g |
| Acid value | 2.8 mg KOH/g |

EXAMPLE 10

1.0 mole of ditrimethylolpropane was charged in a 4-necked reaction flask equipped with a stirrer, nitrogen inlet, a thermometer and a cooler for water separation. The temperature was raised to 120° C. and 4.0 moles of dimethylolpropionic acid together with 5.4 g of methane sulphonic acid were added. The temperature was thereafter raised to 140° C. and maintained until the water distillation had ceased. A vacuum of 15 mm Hg was thereafter applied for 30 minutes followed by an addition of 4.3 g of Ca(OH)$_2$ for neutralisation of the methane sulphonic acid. After 15 minutes, 7.0 moles of soybean fatty acid and 3% by weight of xylene were charged (the amount of xylene was calculated on the subtotal of all included components). The temperature was raised to 230° C. and maintained until an acid value of 4.7 mg KOH/g was obtained. A vacuum of 15 mm Hg was thereafter applied to evaporate the xylene.

Obtained alkyd exhibited the following properties:

| | |
|---|---|
| Nonvolatile content | 100% |
| Viscosity at 23° C. | 620 mPas |
| Gardner colour value | 5 |

EXAMPLE 11

1.0 mole of ditrimethylolpropane was charged in a 4-necked reaction flask equipped with a stirrer, nitrogen inlet, a thermometer and a cooler for water separation. The temperature was raised to 120° C. and 12.0 moles of dimethylolpropionic acid together with 16.0 g of methane sulphonic acid were added. The temperature was thereafter raised to 140° C. and maintained until the water distillation had ceased. A vacuum of 15 mm Hg was thereafter applied for 30 minutes followed by an addition of 12.9 g of Ca(OH)$_2$ for neutralisation of the methane sulphonic acid. After 15 minutes, 13.0 moles of soybean fatty acid and 3% by weight of xylene were charged (the amount of xylene was calculated on the subtotal of all included components). The temperature was raised to 230° C. and maintained until an acid value of 5.4 mg KOH/g was obtained. A vacuum of 15 mm Hg was thereafter applied to evaporate the xylene.

Obtained product exhibited the following properties:

| | |
|---|---|
| Nonvolatile content | 100% |
| Viscosity at 23° C. | 2060 mPas |
| Gardner colour value | 5 |

EXAMPLE 12

1.0 mole of trimethylolpropane was charged in a 4-necked reaction flask equipped with a stirrer, nitrogen inlet, a thermometer and a cooler for water separation. The temperature was raised to 120° C. and 9.0 moles of dimethylolpropionic acid together with 12.0 g of methane sulphonic acid were added. The temperature was thereafter raised to 140° C. and maintained until the water distillation had ceased. A vacuum of 15 mm Hg was thereafter applied for 30 minutes followed by an addition of 9.7 g of Ca(OH)$_2$ for neutralisation of the methane sulphonic acid. After 15 minutes, 10.0 moles of soybean fatty acid and 3% by weight of xylene were charged (the amount of xylene was calculated on the subtotal of all included components). The temperature was raised to 230° C. and maintained until an acid value of 7.3 mg KOH/g was obtained. A vacuum of 15 mm Hg was thereafter applied to evaporate the xylene.

Obtained product exhibited the following properties:

| | |
|---|---|
| Nonvolatile content | 100% |
| Viscosity at 23° C. | 1180 mPas |
| Gardner colour value | 6 |

EXAMPLE 13

(Comparative Experiment)

841.7 g of isophthalic acid, 116.3 g of pentaerythritol, 551.1 g of soybean fatty acid and 3% by weight of xylene were charged in a 4-necked reaction flask equipped with a stirrer, a thermometer, nitrogen inlet and a cooler provided with a water trap (Dean-Stark) for separation of formed reaction water (the amount of xylene was calculated on subtotal of all included components). The temperature was during 90 minutes raised to 230° C. and maintained until an acid value of 5.0 mg KOH/g was obtained. A vacuum of 15 mm Hg was thereafter applied to evaporate the xylene.

Obtained conventional alkyd exhibited the following properties:

| | |
|---|---|
| Nonvolatile content | 100% |

-continued

| Viscosity at 23° C. | 1900 mPas |
| Gardner colour value | 4 |
| Hydroxyl value | 42 mg KOH/g |

As will be seen on a comparison between the results from Examples 8 and 13, as given in Table 2, the alkyd according to the invention (Ex. 8) exhibits a faster hardness growth and a shorter drying time.

EXAMPLE 14

(Comparative Experiment)

841.7 g of soybean oil, 207.6 g of pentaerythritol and 0.015% litharge were charged in a 4-necked reaction flask equipped with a stirrer, a thermometer, nitrogen inlet and a cooler provided with a water-trap (Dean-Stark) for separation of reaction water. The temperature was raised to 240° C. and maintained until 1 part of the reaction mixture was completely soluble in 3 parts of methanol. The temperature was then reduced to 170° C. and 351.3 g of o-phthalic anhydride together with 3% by weight of xylene were charged (the amount of xylene was calculated on subtotal of all included components). Thereafter the temperature was raised to 240° C. and maintained until an acid value of 6.1 mg KOH/g was obtained.

Obtained conventional alkyd exhibited diluted in white spirit the following properties:

| Nonvolatile content | 62.5% |
| Viscosity at 23° C. | 2880 mPas |
| Gardner colour value | 6 |

As will be seen on a comparison between the results from Examples 11 and 14, as given in Table 2, the alkyd according to the invention (Ex. 11) exhibits a faster hardness growth and a shorter drying time.

EXAMPLE 15

The following driers were mixed with the products according to Examples 8–14:

| Zirconium salt | 0.25% |
| Cobalt salt | 0.06% |
| Calcium salt | 0.05% |

Above percentages were calculated as 100% metal on the non-volatile content of the products.

An antiskin agent (Exkin 2, Servo B.V., The Netherlands) was, furthermore, added in an amount of 0.30%.

The thus prepared lacquers were coated on glass panels.

The hardness was recorded with a König Pendulum after 5, 8 and 24 hours of drying at 23°±2° C. and 50±5% relative humidity. The filmthickness was 45±5 μm (dry).

The drying time was measured using a so called Beck-Koller Recorder. The filmthickness was 35±5 μm (dry).

The results are given in Table 2.

EXAMPLE 16

1.0 mole of ditrimethylolpropane was charged in a 4-necked reaction flask equipped with a stirrer, nitrogen inlet, a thermometer and a cooler for water separation. The temperature was raised to 120° C. and 12.0 moles of dimethylolpropionic acid together with 16.0 g of methane sulphonic acid were added. The temperature was thereafter raised to 140° C. and maintained until the water distillation had ceased. A vacuum of 15 mm Hg was thereafter applied for 30 minutes followed by an addition of 12.9 g of Ca(OH)$_2$ for neutralisation of the methane sulphonic acid. After 15 minutes, 9.0 moles of a mixture of caprylic and capric acid together with 3% by weight of xylene were charged (the amount of xylene was calculated on the subtotal of all included components). The temperature was raised to 210° C. and maintained until an acid value of 3.2 mg KOH/g was obtained. A vacuum of 15 mm Hg was thereafter applied to evaporate the xylene.

Obtained product exhibited the following properties:

| Nonvolatile content | 100% |
| Viscosity at 23° C. | 68800 mPas |
| Gardner colour value | 3–4 |
| Hydroxyl value | 127 mg KOH/g |

EXAMPLE 17

The alkyd prepared according to Example 16 was mixed with a hexamethoxymethyl melamine resin at a weight ratio of 70:30 (alkyd:melamine resin), calculated as dry products. The mixture was diluted with xylene/isobutanol (80:20 by weight) to a nonvolatile content of 80% and p-Toluene sulphonic acid was added as curing catalyst.

The thus produced lacquer had a viscosity of 580 mPas at 23° C.

The lacquer was coated on glass panels at a filmthickness of 35°±5 μm (dry) and cured at 160° C. for 10, 20 and 30 minutes. The film hardness was by means of a König Pendulum determined after conditioning at 23°±2° C. and 50±5 relative humidity.

The following results were obtained:

| Curing Time at 160° C. | Pendulum Hardness König seconds |
|---|---|
| 10 | 67 |
| 20 | 70 |
| 30 | 70 |

EXAMPLE 18

A synthetic lubricant was prepared using the same procedure as according to Example 16, with the difference that 13.0 moles of a mixture of caprylic and captic acid were charge instead of 9.0 moles.

Obtained product exhibited the following properties:

| Nonvolatile content | 99.8% |
| Viscosity at 23° C. | 9400 mPas |
| Acid value | 2.6 mg KOH/g |
| Hydroxyl value | 44 mg KOH/g |

EXAMPLE 19

1.0 mole of trimethylolpropane diallyl ether, 2.5 moles of maleic anhydride and a catalytic amount of para-toluene sulphonic acid were charged in a 3-necked reaction flask and dissolved in 1.5 liter of toluene. The temperature was, under stirring and argon purge, raised to 70° C. and the reaction was allowed to continue for 16 hours. The reaction mixture was thereafter repeatedly washed with distilled water, in order to remove the excess of maleic anhydride, and thereafter dried with MgSO$_4$. Prepared intermediate product was used in below examples 20 and 21.

EXAMPLE 20

1.0 mole of ditrimethylolpropane was charged in a 4-necked reaction flask equipped with a stirrer, argon inlet, a thermometer and a cooler for water separation. The temperature was raised to 120° C. and 8.0 moles of dimethylolpropionic acid together with 16.0 g of methane sulphonic acid were added. The temperature was thereafter raised to 140° C. and a stream of argon was allowed to pass through the reaction flask in order to remove formed reaction water. After 2 hours, were 3.0 moles of lauric acid charged. The reaction was thereafter allowed to continue for another 2 hours, after which time the temperature was reduced to 120° C. and a vacuum of 12 mm Hg was applied during 30 minutes. A catalytic amount of hydroquinone and 6.0 moles of trimethylolpropane diallyl ether maleate, according to Example 19, were charged. The reaction was allowed to continue for 8 hours before the resin was cooled.

Obtained properties are given in Table 3.

EXAMPLE 21

The procedure according to Example 20 was repeated with the difference that no lauric acid was charged and that 9.0 moles of trimethylolpropane diallyl ether maleate, according to Example 19, were added instead of 6.0 moles.

Obtained properties are given in Table 3.

EXAMPLE 22

1.5 g of the resin according to Example 20 were mixed with the following amounts of initiators
 0.06540 g of cobalt octoate (6% in butyl acetate)
 0.00230 g of N,N-dimethyl aniline (10% in butyl acetate)
 0.01980 g of benzoyl peroxide (10% in butyl acetate)
 0.03460 g of tert.butyl perbenzoate (50% in butyl acetate)
 0.00028 g of hydroquinone (2.5% in butyl acetate)

Resulting lacquer was coated on glass panels at a filmthickness of 25±5 µm (dry). The layers were after a flash off time of 10 minutes at room temperature cured at 80° C. for 20, 30, 40, 50 and 60 minutes. The film hardness was measured by means of a König Pendulum.

Obtained properties are given in Table 4.

EXAMPLE 23

Example 22 was repeated with the difference that 1.5 g of the resin according to Example 21 was used.

Obtained properties are given in Table 4.

EXAMPLE 24

0.25 mole of ditrimethylolpropane was charged in a 4-necked reaction flask equipped with a stirrer, gas/air inlet, a thermometer and a cooler provided with a water-trap (Dean-Stark). The temperature was raised to 120° C. and 3.0 moles of dimethylolpropionic acid together with 4.0 g of methane sulphonic acid were added. The temperature was thereafter raised to 140° C. and a stream of argon was allowed to pass through the reaction flask in order to remove formed reaction water. The temperature was after 2 hours of reaction reduced to 115° C. and argon was replaced by air. 5.0 moles of acrylic acid, 770.0 g of toluene, 1.1 g of methyl hydroquinone and 0.11 g of nitrobenzene were now charged and the temperature was raised to reflux. Formed reaction water was thus removed by azeotropic distillation. The reaction mixture was after 20 hours, when the theoretical amount of reaction water had been collected, cooled to room temperature.

The room tempered reaction mixture was, in order to obtain a purification of obtained acrylate oligomer, allowed to pass through a column packed with silica gel and aluminium oxide using toluene as eluent.

Toluene was finally evaporated under vacuum with a minor air stream passing through the product.

EXAMPLE 25

The acrylate oligomer according to Example 24 was UV-cured as sole binder as well as in a 50:50 (by weight) mixture with tripropylene glycol diacrylate. A photoinitiator (Irgacure 184, Ciba-Geigy, Switzerland) was added in an amount of 3%.

Resulting lacquers were coated on glass panels at a filmthickness of 30±5 µm (dry) and were UV-cured using a belt speed of 12.4 m/min. and two UV-lamps. The film hardness was measured by means of a König Pendulum.

Obtained properties are given in Table 5.

EXAMPLE 26

The polyester according to Example 2 was mixed with a cycloaliphatic diepoxy resin (Cyracure UVR 6100, Union Carbide, USA) at a weight ratio of 35:65. Three parts of a thermal iodonium salt were added as curing catalyst.

Resulting lacquer was coated on glass panels at a filmthickness of 25±5 µm and was allowed to cure for 10 minutes at 120° C. The film hardness was by means of a König Pendulum determined to be 216 König seconds.

EXAMPLE 27

0.85 mole (308.9 g) of Polyol PP 50 (ethoxylated pentaerythritol, Perstorp Polyols, Sweden) and 0.005 mole (0.46 g) of sulphuric acid were charged in a 4-necked reaction flask equipped with a stirrer, a pressure gauge, a cooler and a receiver. The temperature was raised to 140° C. and 3.42 moles (460.5 g) of dimethylolpropionic acid were during 10 minutes added. When charged dimethylolpropionic acid was completely dissolved thus giving a clear solution, the pressure was reduced to 30–40 mm Hg and the reaction was, under stirring, allowed to continued for 4 hours until an acid value of 7.0 mg KOH/g was reached. 6.84 moles (921.0 g) of dimethylolpropionic acid and 0.010 mole (0.92 g) of sulphuric acid were now during 15 minutes added to the reaction mixture. A vacuum of 30–40 mm Hg was, when a clear solution was obtained, applied. The reaction was thereafter, under stirring, allowed to continue for a further 3 hours, after which time the acid value was determined to be 10.2 mg KOH/g.

The hydroxyl value of prepared polyester was 498 mg KOH/g, corresponding to a theoretical hydroxyl value of 501 mg KOH/g.

EXAMPLE 28

0.40 mole (144.6 g) of Polyol PP 50 (ethoxylated pentaerythritol, Perstorp Polyols, Sweden), 3.21 moles (432.0 g) of dimethylolpropionic acid and 0.005 mole (0.45 g) of sulphuric acid were charged in a 4-necked reaction flask equipped as in Example 27. The temperature was raised to 140° C. A vacuum of 30–40 mm Hg was, when a clear solution was obtained, applied. The reaction was, under stirring, allowed to continue for 3 hours, after which time the acid value was determined to be 7.1 mg KOH/g. 8.01 moles (1080.0 g) of dimethylolpropionic acid and 0.01 mole (1.08 g) of sulphuric acid were now during 15 minutes added to the reaction mixture. A vacuum of 30–40 mm Hg was applied as soon as charged dimethylolpropionic acid was dissolved, thus giving a clear solution. The reaction was, under stirring, now allowed to continue for a further 4 hours giving a final acid value of 10.9 mg KOH/g.

The hydroxyl value of prepared polyester was 489 mg KOH/g, corresponding to a theoretical hydroxyl value of 486 mg KOH/g.

EXAMPLE 29

0.05 mole (18.1 g) of Polyol PP 50 (ethoxylated pentaerythritol, Perstorp Polyols, Sweden), 3.0 moles (405.0 g) of dimethylolpropionic acid and 0.009 mole (0.84 g) of sulphuric acid were charged in a 4-necked reaction flask equipped as in Example 27. The temperature was raised to 140° C. A vacuum of 30–40 mm Hg was, when a clear solution was obtained, applied. The reaction was, under stirring, allowed to continue for 1 hour, after which time the acid value was determined to be 28.0 mg KOH/g. 9.6 moles (1296.0 g) of dimethylolpropionic acid and 0.03 mole (2.7 g) of sulphuric acid were now during 20 minutes added to the reaction mixture. A vacuum of 30–40 mm Hg was applied as soon as charged dimethylolpropionic acid was dissolved, thus giving a clear solution. The reaction was now allowed to continued for a further 2 hours giving a final acid value of 23.5 mg KOH/g.

The hydroxyl value of prepared polyester was 468 mg KOH/g, corresponding to a theoretical hydroxyl value of 462 mg KOH/g.

EXAMPLE 30

200.0 g of the polyester according to Example 27, 245.6 g (1.82 mole) of dimethylolpropionic acid and 0.24 g (0.003 mole) of sulphuric acid were charged in a 4-necked reaction flask equipped as in Example 27. The temperature was raised to 140° C. A vacuum of 30–40 mm Hg was, when a clear solution was obtained, applied. The reaction was allowed to continue for 3 hours, after which time the acid value was determined to be 6.7 mg KOH/g. 491.4 g (3.65 moles) of dimethylolpropionic acid and 0.48 g (0.006 mole) of sulphuric acid were now added to the reaction mixture. A vacuum of 30–40 mm Hg was applied as soon as charged dimethylolpropionic acid was dissolved, thus giving a clear solution. The reaction was, under stirring, allowed to continue for a further 7 hours giving a final acid value of 7.8 mg KOH/g.

EXAMPLE 31

400.0 g of the polyester according Example 27, 938.0 g (3.29 moles) of tall oil fatty acid and 0.30 g (0.004 mole) of Ca(OH)$_2$ were charge in a 4-necked reaction flask equipped as in Example 27. The temperature was raised to 130° C. followed by an addition of a further 0.30 g of Ca(OH)$_2$. The temperature was thereafter raised to 230° C. and a vacuum of 30–40 mm Hg was applied. After 3 hours of reaction, an esterification catalyst (Fascat 4100, Atochem, The Netherlands) was added in an amount of 1.0 g. The reaction was, under stirring and a vacuum of 30–40 mm Hg, now allowed to continue for a further hour, after which time the acid value was determined to be 8.2 mg KOH/g. Obtained alkyd was, to remove suspended particles, finally filtered under pressure.

Obtained alkyd exhibited the following properties:

| Nonvolatile content | 100 % |
| Viscosity at 23° C. | 1800 mPas |
| Gardner colour value | 5–6 |

EXAMPLE 32

220.0 g of the polyester according to Example 28 and 500.4 g (1.76 mole) of tall oil fatty acid were charged in a 4-necked reaction flask equipped as in Example 27. The temperature was raised to 140° C. followed by an addition of Ca(OH)$_2$ in an amount of 1.0 g. A vacuum of 30–40 mm Hg was thereafter applied and the temperature was raised to 230° C. The reaction was, under stirring, allowed to continue for 7 hours, after which time the acid value was determined to be 9.4 mg KOH/g. Obtained alkyd was, to remove suspended particles, finally filtered under pressure.

Obtained alkyd exhibited the following properties:

| Nonvolatile content | 100% |
| Viscosity at 23° C. | 14000 mPas |

Dissolved in ethanol above alkyd exhibited the following properties:

| Nonvolatile content | 85% |
| Viscosity at 23° C. | 1240 mPas |
| Gardner colour value | 5–6 |

EXAMPLE 33

220.0 g of the polyester according to Example 29 and 492.0 g (1.73 mole) of tall oil fatty acid were charged in a 4-necked reaction flask equipped as in Example 27. The temperature was raised to 140° C. followed by an addition of Ca(OH)$_2$ in an amount of 1.0 g. A vacuum of 30–40 mm Hg was thereafter applied and the temperature was raised to 230° C. The reaction was, under stirring, allowed to continue for 10 hours, after which time the acid value was determined to be 9.5 mg KOH/g. Obtained alkyd was, to remove suspended particles, finally filtered under pressure.

Obtained alkyd exhibited the following properties:

| Nonvolatile content | 100% |
| Viscosity at 23° C. | 43500 mPas |

Dissolved in ethanol above alkyd exhibited the following properties:

| Nonvolatile content | 85% |
| Viscosity at 23° C. | 3000 mPas |
| Gardner colour value | 5–6 |

EXAMPLE 34

300.0 g of the polyester according to Example 30, 675.7 g (2.37 moles) of tall oil fatty acid, 0.5 g of an esterification catalyst (Fascat 4100, Atochem, The Netherlands) and 0.2 g of Ca(OH)$_2$ were charged in a 4-necked reaction flask equipped as in Example 27. The temperature was raised to 170° C. followed by an addition of a further 0.1 g of Ca(OH)$_2$. A vacuum of 30–40 mm Hg was thereafter applied and the temperature was raised to 230° C. The reaction was, under stirring, allowed to continue for 2 hours, after which time the acid value was determined to be 11.2 mg KOH/g. Obtained alkyd was, to remove suspended particles, finally filtered under pressure.

Obtained alkyd exhibited the following properties:

| Nonvolatile content | 100% |
| --- | --- |
| Viscosity at 100° C. | 620 mPas |
| Gardner colour value | 5–6 |

EXAMPLE 35

An alkyd emulsion was prepared through emulsification in water of the alkyd according to Example 29. The emulsification was performed using a micro-fluidizer.

200.0 g of the alkyd according to Example 29 were charged in a double flanged vessel connected to an external water bath, in which vessel the alkyd was heated to 60° C. 12.0 g of a nonylphenolic emulsifier with an HLB-value of 16.0 were at 60° C. dissolved in 188.0 g of water. The water/emulsifier solution was, under heavy stirring by means of a high-speed dissolver, added to the alkyd. The thus formed emulsion was stirred for 5 minutes at 60° C. and 2000 rpm. In order to further reduce the particle size and form a stable emulsion, this was heated to 80° C. and was for 6 minutes (12 passages) allowed to pass through a micro-fluidizer holding a temperature of 80° C.

Obtained alkyd emulsion exhibited the following properties:

| Nonvolatile content | 50% |
| --- | --- |
| Average particle size | 0.37 μm |

EXAMPLE 36

The alkyd according to Example 30 was emulsified using the same procedure as disclosed in example 35, but with the following two differences:

a) An emulsifier with an HLB-value of 17.2 was used.
b) 8.0 g of the emulsifier were dissolved in 192.0 g of water.

Obtained alkyd emulsion exhibited the following properties:

| Nonvolatile content | 50% |
| --- | --- |
| Average particle size | 0.41 μm |

EXAMPLE 37

211.8 g of the polyester according to Example 28, 139.4 g (0.94 mole) of a mixture of capric and caprylic acid, 0.21 g (0.003 mole) of Ca(OH)$_2$ and 3.0 g of xylene were charged in a 4-necked reaction flask equipped with a stirrer, nitrogen inlet, a cooler and a water-trap (Dean-Stark). The temperature was during 2 hours raised to 200° C. The reaction was, under stirring, allowed to continue for 6 hours, after which time the acid value was determined to be 9.9 mg KOH/g.

Obtained product exhibited the following properties:

| Nonvolatile content | 91% |
| --- | --- |
| Viscosity at 23° C. | 33600 mPas |
| Hydroxyl value | 165 mg KOH/g |
| Theoretical hydroxyl value | 158 mg KOH/g |

EXAMPLE 38

450.0 g of the polyester according to Example 27,242.0 g (1.64 mole) of a mixture of capric and caprylic acid, 0.45 g (0.006 mole) of Ca(OH)$_2$ and 21.0 g of xylene were charged in a 4-necked reaction flask equipped as in Example 37. The temperature was during 1 hour raised to 200° C. The reaction was allowed to continue at 200° C. until an acid value of 8.3 mg KOH/g was reached.

Obtained product exhibited the following properties:

| Nonvolatile content | 92% |
| --- | --- |
| Viscosity at 23° C. | 25200 mPas |
| Hydroxyl value | 215 mg KOH/g |
| Theoretical hydroxyl value | 208 mg KOH/g |

EXAMPLE 39

100.0 g of the product according to Example 37, 24.5 g (0.34 mole) of acrylic acid, 150 ml of toluene, 100.0 mg of methyl hydroquinone, 30.0 mg of nitrobenzene and 1.0 g of methane sulphonic acid were charged in a 3-necked reaction flask equipped with a Teflon ® lined magnetic stirrer, air inlet, a cooler and a water-trap (Dean-Stark). The reaction mixture was heated to 135° C. and refluxed for 2 hours. 20.0 (0.28 mole) of acrylic acid and 1.0 g of methane sulphonic acid were thereafter added and the reaction was allowed to continue at 135° C. for a further 4 hours. The reaction mixture was now cooled to room temperature and neutralised to pH 7 using a 5% aqueous solution of NaOH ($\approx$250 ml). The resulting mixture separated into two phases, excess of acrylic acid, as sodium acrylate, being in the water-phase which was removed. Additional 250 ml of toluene were charged and the solution was washed with distilled water (3×150 ml) followed by an addition of 20.0 g of active carbon and 10.0 g of a filter aid (Celite). The mixture was heated to 60° C. and after 30 minutes filtered under pressure. 20.0 mg of methyl hydroquinone were finally added to the product/toluene mixture, whereupon toluene was evaporated at 40°–50° C. and 20 mm Hg with a minor stream of air bubbling through the product.

Obtained polyester acrylate exhibited the following properties:

| Nonvolatile content | 99% |
| --- | --- |
| Viscosity at 23° C. | 52000 mPas |
| Acid value | 5.4 mg KOH/g |

EXAMPLE 40

200.0 g of the product according to Example 38, 100.8 g (1.4 mole) of acrylic acid, 500 ml of toluene, 400.0 mg of methyl hydroquinone, 50.0 mg of nitrobenzene and 3.0 g of methane sulphonic acid were charged in a 3-necked reaction flask equipped as in Example 39. The reaction mixture was heated to 130° C. and refluxed for 5 hours, whereupon it was cooled to room temperature and neutralised to pH 7 using a 5% aqueous solution of NaOH ($\approx$250 ml). The resulting mixture separated into two phases, excess of acrylic acid, as sodium acrylate, being in the water-phase which was removed. The solution was then washed with distilled water (3×400 ml) followed by an addition of 50.0 g of active carbon and 50.0 g of a filter aid (Celite). The mixture was heated to 60° C. and after 30 minutes filtered under pressure. 40.0 mg of methyl hydroquinone were finally added to the product/toluene mixture, whereupon toluene was evaporated at 40°–50° C. and 20 mm Hg with a minor stream of air bubbling through the product.

Obtained polyester acrylate exhibited the following properties:

| | |
|---|---|
| Nonvolatile content | 98% |
| Viscosity at 23° C. | 16600 mPas |
| Acid value | 3.8 mg KOH/g |

EXAMPLE 41

A polyester epoxy resin was prepared in 2 steps.

Step 1—200.0 g of the product according to Example 38, 200 ml of toluene and 0.2 g (0.002 mole) of sulphuric acid were charged in a 4-necked reaction flask equipped with a stirrer and a cooler. The temperature was raised to reflux ($\approx$110° C.) followed by an addition of 68.8 g (0.74 mole) of 1-chloro-2,3-epoxy propane during 30 minutes. The reaction mixture was now refluxed for 6 hours, whereupon an additional amount of 2.0 g of sulphuric acid were added. The solution was now refluxed for a further 8 hours, after which time it was cooled to 50° C. An ethyl ether solution of BF$_3$ (50% BF$_3$) was thereafter added in an amount of 1.0 g and the temperature was raised to $\approx$110° C. The reaction solution was refluxed for 2 hours and then cooled to room temperature.

A gas chromatographic analysis showed less than 0.1% of unreacted 1-chloro-2,3-epoxy propane and the intermediate polyester halohydrin was thus presumed to have been obtained.

Step 2—The reaction mixture from Step 1 above was heated to 50° C. and 116.3 g (0.41 mole) of Na$_2$SiO$_3$·9H$_2$O were added. The temperature was raised to reflux ($\approx$90° C.) and the reaction mixture was allowed to reflux for 4 hours. The reaction mixture was then cooled to room temperature and in order to remove suspended particles filtered under pressure.

Toluene and water were evaporated at 50° C. and 20 mm Hg. Acetone was then added and the resulting solution was once again filtered under pressure followed by evaporation of acetone at 50° C. and 20 mm Hg.

Obtained polyester epoxy exhibited the following properties:

| | |
|---|---|
| Nonvolatile content | 98% |
| Viscosity at 23° C. | 14000–15000 mPas |
| Epoxy equivalent weight (EEW-value) | 935 |

The EEW-value of 935 indicates that approximately one third of the hydroxyl groups have been conversed into epoxy groups.

EXAMPLE 42

200.0 g of the polyester according to Example 27, 259.8 g (0.92 mole) of tall oil fatty acid and 0.28 g of Ca(OH)$_2$ were charged in a 4-necked reaction flask equipped as in Example 37. The temperature was during 2 hours raised to 210° C. and the reaction was allowed to continue for 3 hours, after which time the acid value was determined to be 21.2 mg KOH/g.

Obtained alkyd exhibited the following properties:

| | |
|---|---|
| Nonvolatile content | 100% |
| Viscosity at 23° C. | 2000 mPas |
| Gardner colour value | 6 |

EXAMPLE 43

70.6 g of the product according to Example 37, 16.5 g of a hexamethoxymethyl melamine resin (nonvolatile content 97.2%), 9.0 g of xylene, 3.9 g of isobutanol and 0.64 g of para-toluene sulphonic acid (50% in ethanol) were mixed.

Resulting lacquer exhibited the following properties:

| | |
|---|---|
| Nonvolatile content | 80% |
| Viscosity at 23° C. | 1760 mPas |

The lacquer was filtered and thereafter coated on glass panels at a filmthickness of 40±5 μm (dry) and cured at 160° C. for 10, 20 and 30 minutes. The film hardness was by means of a König Pendulum determined after conditioning at 23°±2° C. and 50±5 relative humidity.

The following results were obtained:

| Curing Time at 160° C. | Pendulum Hardness König seconds |
|---|---|
| 10 | 87 |
| 20 | 87 |
| 30 | 80 |

EXAMPLE 44

An acid curing lacquer was prepared having the following formulation:

| | |
|---|---|
| Alkyd according to Example 42 | 28.22 g |
| Urea resin (nonvolatile content 74%) | 15.04 g *1 |
| Melamine resin (nonvolatile content 95%) | 2.24 g *2 |
| Ethanol | 4.57 g |
| Nitrocellulose (nonvolatile content 26%) | 17.57 g *3 |
| Methoxy propanol | 8.61 g |
| Butyl acetate | 13.83 g |

-continued

| p-Toluene sulphonic acid (20% in ethanol) | 5.56 g |

*1 Dynomin U121E, Dyno Cyanamid K.S., Norway
*2 Dynomin MB98, Dyno Cyanamid K.S, Norway
*3 VF-1/2, Nobel Kemi AB, Sweden Resulting lacquer exhibited the following properties:

| Nonvolatile content | 51.9% |
| Viscosity at 23° C. (Ford Cup no. 4) | 26 seconds |

The lacquer was coated on glass panels at a filmthickness of 40±5 μm (dry) and cured at 23° C. and 60° C. The film hardness was by means of a König Pendulum determined after conditioning at 23°±2° C. and 50±5% relative humidity.

The following results were obtained:

| | Pendulum Hardness König seconds |
|---|---|
| Curing Time at 23° C. | |
| 30 | 11 |
| 60 | 17 |
| 120 | 24 |
| 140 | 31 |
| Curing Time at 60° C. | |
| 5 | 36 |
| 10 | 42 |
| 15 | 45 |
| 20 | 48 |
| 25 | 49 |

EXAMPLE 45

The following driers were mixed with products according to Examples 31–34:

| Zirconium salt | 0.25% |
| Cobalt salt | 0.03% |

Above percentages were calculated as 100% metal on the non-volatile content of the products.

An antiskin agent (Exkin 2, Servo B.V., The Netherlands) was, furthermore, added in an amount of 0.30%.

The thus prepared lacquers were coated on glass panels at a filmthickness of 50±5 μm.

The drying time was measured as through dry using the thumb test method.

The results are given in Table 7.

EXAMPLE 46

The following watersoluble driers were mixed with alkyd emulsions according to Examples 35 and 36

| Zirconium salt | 0.25%* |
| Cobalt salt | 0.20%* |

*Servosyn Web, Servo Delden B.V, The Netherlands

Above percentages were calculated as 100% metal on the non-volatile content of the products.

An antiskin agent (Exkin 2, Servo B.V., The Netherlands) was, furthermore, added in an amount of 0.30%.

The thus prepared lacquers were coated on glass panels at a filmthickness of 40±5 μm.

The drying time was measured as through dry using the thumb test method.

The results are given in Table 7.

EXAMPLE 47

UV-curing lacquers based on polyester acrylates according to Examples 39 and 40 were prepared having the following formulation:

| Polyester acrylate acc. to Ex. 39 or 40 | 50.0 g |
| Tripropylene glycol diacrylate | 25.0 g |
| Polyol TP 30 triacrylate | 25.0 g *1 |
| Photoinitiator | 4.0 g *2 |

*1 Trifunctional acrylic monomer prepared from Polyol TP 30 (ethoxylated trimethylolpropane, Perstorp Polyols, Sweden) and acrylic acid. The monomer can be prepared according to known acrylation procedures.
*2 Darocur 1173, Firma E. Merck, Fed. Rep. of Germany Lacquer based ion polyester acrylate according to Ex. 39 had a viscosity of 480 mPas, while the viscosity of corresponding lacquer based on polyester acrylate according to Ex. 40 was 330 mPas. Both viscosities were determined at 23° C.

The lacquers were coated on glass and steel panels at a film-thickness of 30±5 μm (dry) and were UV-cured. UV-curing was performed using a Labcure Unit LC9 from Wallace Knight, UK, having a belt speed of 20 m/min. and an irradiation source consisting of medium pressure quartz mercury lamps of 80 Watts/cm.

The results are given in Table 6.

EXAMPLE 48

67.0 g (0.50 mole) of trimethylolpropane, 20.0 g of xylene and 0.67 g of an esterification catalyst (Fascat 4100, Atochem, The Netherlands) were charged in a 3-necked reaction flask equipped as in Example 39. The temperature was raised to 160° C. and 603.0 g (4.50 moles) of dimethylolpropionic acid was during 30 minutes added. The temperature was thereafter raised to 190° C. and the reaction was allowed to continue for 7 hours, after which time the acid value was determined to be 50.2 mg KOH/g.

The hydroxyl value of obtained polyester was 557 mg KOH/g, corresponding to a theoretical hydroxyl value of 572 mg KOH/g.

EXAMPLE 49

60.0 g of the polyester according to Example 48, 562.8 g (4.20 moles) of dimethylolpropionic acid, 380.0 g (1.33 mole) of tall oil fatty acid, 30.0 g of xylene and 1.0 g of an esterification catalyst (Fascat 4100, Atochem, The Netherlands) were charged in a 3-necked reaction flask equipped as in Example 39. The temperature was raised to 210° C. and the reaction was allowed to continued for 5 hours until an acid value of 6.3 mg KOH/g was reached. Additional 760.0 g (2.67 moles) of tall oil fatty acid was thereafter charged and the reaction was allowed to continue for another 11 hours, after which time the acid value was determined to be 6.7 mg KOH/g. Resulting alkyd was, to remove suspended particles, finally filtered under pressure at a temperature of 100° C.

Obtained alkyd exhibited the following properties:

| Nonvolatile content | 100% |

| Viscosity at 23° C. | 20200 mpas |
|---|---|

EXAMPLE 50

The alkyd according to Example 49 was, by oxidation of double bonds, converted into an epoxy resin. The process involved a catalyst disclosed by Crivello, J. V.; Narayan, R. in Chem. Mater. 1992, 4, pages 692–699.

Preparation of Catalyst

Glacial acetic acid was to 40.0 g of an ion-exchange resin (Amberlite IR-120 plus, Rohm & Haas Co., USA) added in such an amount that the resin was immersed. The mixture was at room temperature stirred mechanically during 4–5 hours and was thereafter washed with 8×40 ml of acetone. The catalyst was ready for use after a drying time of 24 hours at room temperature.

Preparation of Epoxy Resin 20.0 g of the alkyd according to Example 49, 10.0 ml of toluene, 1.52 g of glacial acetic acid and 2.06 g of above catalyst were mixed and heated under mechanical stirring to 50° C. 6.73 g of hydrogen peroxide was added by drops. The temperature was during the peroxide addition not allowed to exceed 55° C. A large volume of toluene was after 12 hours added and the solution was filtered. An additional portion of toluene was thereafter added and the solution was several times dried with $MgSO_4$. Nonvolatile matters were finally evaporated using a rotary evaporator.

Obtained product was characterized through NMR and the degree of conversion of unsaturated bonds to epoxidized groups was determined to be 88%.

EXAMPLE 51

A hyperbranched polyester was prepared as a so called 9 generations dendrimer and the Mark-Houwink constant was determined.

The polyester synthesis was in 8 steps carried out in a flanged reaction flask equipped with argon inlet, a Teflon ® lined magnetic stirrer, a drying tube and a junction to water suction. The reaction flask was placed in an oil bath holding a constant temperature of 150° C. Each of the 8 steps of the synthesis consisted of 2 hours of reaction with a stream of argon passing through the reaction mixture and 1 hour of reaction under vacuum.

The scheme of the synthesis was as follows and the reaction conditions as above:

Step 1: 0.0056 mole of trimethylolpropane, 0.05 mole of dimethylolpropionic acid and 0.34 g of para-toluene sulphonic acid were charged.

Step 2: 0,067 mole of dimethylolpropionic acid and 0,045 g of para-toluene sulphonic acid were added to the reaction product of step 1.

Step 3: 0.13 mole of dimethylolpropionic acid and 0.09 g of para-toluene sulphonic acid were added to the reaction mixture of step 2.

Step 4: 0.13 mole of dimethylolpropionic acid and 0.09 g of para-toluene sulphonic acid were added to 15.0 g of the reaction product of step 3.

Step 5: 0.13 mole of dimethylolpropionic acid and 0.09 g of para-toluene sulphonic acid were added to 15.0 g of the reaction product of step 4.

Step 6: 0.13 mole of dimethylolpropionic acid and 0.09 g of para-toluene sulphonic acid were added to 15.0 g of the reaction product of step 5.

Step 7: 0.13 mole of dimethylolpropionic acid and 0.09 g of para-toluene sulphonic acid were added to 15.0 g of the reaction product of step 6.

Step 8: 0.13 mole of dimethylolpropionic acid and 0.09 g of para-toluene sulphonic acid were added to 15.0 g of the reaction product of step 7.

The after the 8th reaction step thus obtained product was a 9 generations dendritic polyester having a theoretical molecular weight of 178000 g/mole.

The Mark-Houwink constant was for above polyester determined by means of a RALLS Laser-RI Viscosimetry Equipment* from Viskotek Inc., USA, which is a system consisting of a size exclusion chromatograph with 3 detectors in serial and computerised software processing of data.

* RALLS=Right Angel Laser Light Scattering RI=Refractive Index 6.0 mg of prepared dendritic polyester were dissolved in 1.0 ml of tetrahydrofuran and 100.0 μl of the solution were injected into above equipment.

The Mark-Houwink constant for above polyester was found to be $\alpha=0.23$, which value complies with corresponding theoretical value for a spherical macromolecule.

EXAMPLE 52

A polyurethane dispersion based on a dendritic polyester was prepared in 2 steps and evaluated in a lacquer formulation.

Step 1: 300.0 g of the polyester according to Example 27 were charged in a 4-necked reaction flask, equipped as in Example 27, and heated to 130° C. 98.6 g of propionic acid were thereafter during 15 minutes added and the reaction was allowed continue for 2.5 hours, giving an acid value of 11.9 mg KOH/g and a hydroxyl value of 276 mg KOH/g Step 2: 73.0 g of the product obtained according to Step 1, 23.1 g of isophorone diisocyanate, 5.0 g of dimethylolpropionic acid, 20.0 mg of benzoyl chloride, 0.16 g of Sn(II)-octoate and 200 ml of acetone were charged in a 3-necked reaction flask equipped with a Teflon ® lined magnetic stirrer, a cooler and a Dean-Stark separator. A water bath was used as heating device. The reaction mixture was during 8 hours refluxed at 58° C., whereupon an additional amount of 0.16 g of Sn(II)-octoate was added. The reaction was now allowed to continue for 5 hours, after which time 4.0 g of dimethylethanol amine and 126.0 g of water were added. Acetone was thereafter removed from the reaction mixture by distillation. Small amounts of dimethylethanol amine were during the distillation added in order to improve the solubility of the product in the water phase.

Obtained product, a transparent low viscous polyurethane dispersion, exhibited the following properties:

| Nonvolatile content: | 37.4% |
|---|---|
| Free NCO-content: | 0.2% |
| NCO-conversion: | 92% |

Above polyurethane dispersion was mixed with a water soluble melamine resin (Cymel 327, Dyno Cyanamid K.S., Norway) forming a lacquer with the following formulation:

| Polyurethane dispersion (as solid) | 60% by weight |
|---|---|

-continued

| Melamine resin (as solid) | 40% by weight |
|---|---|

Prepared lacquer was coated on glass panels at a filmthickness of 40±5 μm (dry) and cured at 160° C. The film hardness was after curing and conditioning at 23 ±2° C. and 50±5% relative humidity determined by means of a König Pendulum.

A pendulum hardness of 180 König seconds was after 10 minutes of curing at 160° C. obtained.

TABLE 1

| Example no. | Properties |||||||
|---|---|---|---|---|---|---|---|
| | 1. | 2. | 3. | 4. | 5. | 6. | 7. |
| 1 | 1.5 | ⅔ | 2637 | 3027 | 2322 | 1.30 | 10.0 |
| 2 | 1.5 | ⅓ | 1908 | 2045 | 1527 | 1.34 | 1037 |
| 3 | 1.5 | All | 3366 | 3513 | 2811 | 1.25 | 1.5 |
| 4 | 1 | ⅔ | 1686 | 2000 | 1638 | 1.22 | 3.9 |
| 5 | 1 | All | 2173 | 2000 | 1621 | 1.23 | 0.73 |
| 6 | 2 | ⅔ | 2588 | 4094 | 3142 | 1.30 | 18.4 |
| 7 | 2 | All | 4560 | 4406 | 3105 | 1.42 | 2.6 |

1. Moles charged dimethylolpropionic acid per mole hydroxyl groups from ditrimethylolpropane.
2. Hydroxyl groups, from product obtained in step 1, which have been further reacted with fatty acid in step 2.
3. Calculated molecular weight of the final product, as obtained after step 2, expressed in g/mole.
4. Molecular weight, $M_w$.
5. Molecular weight, $M_n$.
6. Dispersivity H, $M_w/M_n$
7. Viscosity at 23° C. in Pas

TABLE 2

| Example no. | 8 | 9 | 10 | 11 | 12 | 13 | 14 |
|---|---|---|---|---|---|---|---|
| Base polyol | DiTMP | DiTMP | DiTMP | DiTMP | TMP | — | — |
| Moles DMPA/mole base polyol | 8 | 8 | 4 | 12 | 9 | — | — |
| Hydroxyl groups from step 1 terminated in step 2 | 10/12 | 10/12 | 7/8 | 13/16 | 10/12 | — | — |
| Calculated Properties | | | | | | | |
| Acid number, mg KOH/g | 0 | 0 | 0 | 0 | 0 | 4.5 | 10 |
| Hydroxyl number, mg KOH/g | 32 | 35 | 22 | 34 | 30 | 32 | 63 |
| Molecular weight, g/mole | 3518 | 3208 | 2527 | 5009 | 3768 | 1860 | 4060 |
| Oil length as triglyceride, % | 82.3 | 72.2 | 80.2 | 75.2 | 76.9 | 82.2 | 61.8 |
| Determined Properties | | | | | | | |
| Acid number, mg KOH/g | 4.5 | 2.8 | 4.7 | 5.4 | 7.3 | 5.0 | 6.1 |
| Hydroxyl number, mg KOH/g | 21 | 32 | 26 | 21 | 20 | 42 | — |
| Nonvolatile content, % | 100 | 100 | 100 | 100 | 100 | 100 | 62.5 |
| Viscosity at 23° C., mPas | 1160 | 2950 | 620 | 2060 | 1180 | 1900 | 2880 |
| Film Hardness, König seconds | | | | | | | |
| 5 hours drying | 22 | 21 | 18 | 24 | 21 | Tacky | 8 |
| 8 hours drying | 27 | 15 | 24 | 45 | 46 | 11 | 10 |
| 24 hours drying | 76 | 36 | 69 | 73 | 63 | 24 | 10 |
| Drying Time, Beck-Koller | | | | | | | |
| Dust dry, hours | 3.0 | 2.3 | 3.3 | 2.0 | 2.0 | 3.0 | 1.5 |
| Through dry, hours | 4.5 | 13.0 | 6.8 | 4.2 | 4.6 | >24 | 21.5 |

DiTMP = Ditrimethylolpropane
DMPA = Dimethylolpropionic acid
TMP = Trimethylolpropane

TABLE 3

| Properties | Example no. 20 | Example no. 21 |
|---|---|---|
| Viscosity at 23° C., Pas | 33 | 210 |
| Nonvolatile content, % | 100 | 100 |
| Calculated molecular weight, g/mole | 3490 | 3830 |
| Analysed molecular weight $M_n$, g/mole | 4000 | 4800 |
| Analysed molecular weight $M_w$, g/mole | 6400 | 18100 |
| Dispersivity H, $M_w/M_n$ | 1.62 | 3.78 |

TABLE 4

| Curing time at 80° C. | Pendulum hardness in König Seconds ||
|---|---|---|
| | Example 22 | Example 23 |
| 20 minutes | 14 | 119 |
| 30 minutes | 58 | 144 |
| 40 minutes | 75 | 160 |
| 50 minutes | 86 | 161 |
| 60 minutes | 96 | 167 |

TABLE 5

| Number of passages under UV-lamps | Pendulum Hardness in König Seconds ||
|---|---|---|
| | Product acc. to Example 24 | Product acc. to Example 24 mixed 50:50 with TPGDA |
| 1 passage | 122 | Adhesive* |
| 2 passages | 153 | — |
| 3 passages | 161 | 126 |
| 4 passages | 165 | 133 |
| 5 passages | 165 | 133 |
| 6 passages | — | 139 |
| 7 passages | — | 136 |
| 10 passages | 170 | — |

TPGDA = Tripropylene glycol diacrylate
*Oxygen inhibition

TABLE 6

| Number of passages under UV-lamps | Acrylate acc. to Example 39 | Acrylate acc. to Example 40 |
|---|---|---|
| | Pendulum Hardness in König Seconds ||
| 1 passage | 66 | 67 |
| 2 passages | 77 | 80 |
| 4 passages | 90 | 88 |
| 8 passages | 106 | 111 |
| 16 passages | 134 | 118 |
| | Pencil Hardness ||
| 8 passages | B-HB | B-HB |
| | Erichsen Flexibility in mm ||
| 8 passages | 3.1 | 3.4 |

TABLE 7

| Example no. | 31 | 32 | 33 | 34 | 35 | 36 |
|---|---|---|---|---|---|---|
| Base polyol | PP 50 | PP 50 | PP 50 | PP 50 | PP 50 | PP 50 |
| Moles DMPA/mole base polyol | 12 | 28 | 252 | 60 | 124 | 60 |
| Hydroxyl groups from step 1 terminated in step 2 | 14/16 | 29/32 | 239/256 | 58/64 | 239/256 | 58/64 |
| Calculated Properties | | | | | | |
| Acid number, mg KOH/g | 0 | 0 | 0 | 0 | 0 | 0 |
| Hydroxyl number, mg KOH/g | 16 | 15.9 | 15.8 | 15.8 | 15.8 | 15.8 |
| Molecular weight, g/mole | 5600 | 11300 | 91000 | 22700 | 91000 | 22700 |
| Oil length as triglyceride, % | 82.3 | 72.2 | 80.2 | 75.2 | 76.9 | 82.2 |
| Determined Properties | | | | | | |
| Acid number, mg KOH/g | 8.2 | 9.4 | 9.5 | 11.2 | 9.5 | 11.2 |
| Nonvolatile content, % | 100 | 100 | 100 | 100 | 50* | 50* |
| Viscosity at 23° C., mPas | 1800 | 1400 | 43500 | — | — | — |
| Drying | | | | | | |
| Through dry, hours | 5–6 | 3 | 2 | 2–3 | 6–7 | 7–8 |

PP 50 = Polyol PP 50 (ethoxylated pentaerythritol, Perstorp Polyols, Sweden)
*Alkyd emulsion

We claim:
1. A dendritic macromolecule wherein
(i) a central initiator molecule or initiator polymer having at least one reactive hydroxyl group (A), which hydroxyl group (A) under formation of an initial tree structure is bonded to a reactive carboxyl group (B) in a monomeric chain extender having the two reactive groups (A) and (B), which tree structure
(ii) optionally is extended and further branched from the initiator molecule or initiator polymer through an addition of further molecules of a monomeric chain extender by means of bonding with the reactive groups (A) and (B) thereof and
(iii) optionally is further extended through reaction with a chain stopper
and wherein the monomeric chain extender has at least one carboxyl group (B) and at least two hydroxyl groups (A) or hydroxyalkyl substituted hydroxyl groups (A).

2. The dendritic macromolecule according to claim 1 wherein the central initiator molecule or initiator polymer is selected from the group consisting of:
a) an aliphatic, a cycloaliphatic or an aromatic diol
b) a triol
c) a tetrol
d) a sugar alcohol
e) anhydroennea-heptitol or dipentaerythritol
f) an α-alkylglucoside
g) a monofunctional alcohol
h) an alkoxylate polymer having a molecular weight of at most 8000 and being produced by reaction between an alkylene oxide and one or more hydroxyl groups originating from compounds a) through g).

3. The dendritic macromolecule according to claim 2 wherein said initiator molecule is selected from the group consisting of ditrimethylolpropane, ditrimethylolethane, dipentaerythritol, pentaerythritol, alkoxylated pentaerythritol, trimethylolethane, trimethylolpropane, alkoxylated trimethylolpropane, glycerol, neopentyl glycol, dimethylolpropane, 1,3-dioxane-5,5-dimethanol, sorbitol, mannitol and α-methylglucoside.

4. The dendritic macromolecule according to claim 1 wherein the chain extender is selected from the group consisting of:
a) a monofunctional carboxylic acid having at least two hydroxyl groups
b) a monofunctional carboxylic acid having at least two hydroxyl groups wherein one or more of the hydroxyl groups are hydroxyalkyl substituted.

5. The dendritic macromolecule according to claim 4 wherein said chain extender is selected from the group consisting of dimethylolpropionic acid, α,α-bis (hydroxymethyl)butyric acid, α,α,α-tris(hydroxymethyl)-acetic acid, α,α-bis-(hydroxymethyl)valeric acid, α,α-bis(hydroxy)propionic acid and 3,5-dihydroxybenzoic acid.

6. The dendritic macromolecule according to claim 1 wherein said macromolecule is chain stopped and the chain stopper is selected from the group consisting of:
a) a saturated monofunctional carboxylic acid or a saturated fatty acid or an anhydride thereof
b) an unsaturated fatty acid
c) an unsaturated monofunctional carboxylic acid
d) a diisocyanate or an oligomer thereof
e) an adduct of a reaction product of a diisocyanate or an oligomer thereof
f) a difunctional or a polyfunctional carboxylic acid or an anhydride thereof
g) an adduct of a reaction product difunctional or a polyfunctional carboxylic acid or an anhydride thereof
h) an aromatic monofunctional carboxylic acid
i) an epihalohydrin
j) a glycidyl ester of a monofunctional carboxylic acid or of a fatty acid, which acid has 1–24 carbon atoms
k) an epoxide of an unsaturated fatty acid with 3–24 carbon atoms.

7. The dendritic macromolecule according to claim 6 wherein said chain stopper is selected from the group consisting of lauric acid, linseed fatty acid, soybean fatty acid, tall oil fatty acid, dehydrated castor fatty acid, capric acid, caprylic acid, trimethylolpropane diallyl ether maleate, metacrylic acid, acrylic acid, benzoic acid, para-tert.butylbenzoic acid, 1-chloro-2,3-epoxy propane, 1,4-dichloro-2,3-epoxy butane and epoxidized soybean fatty acid.

8. The dendritic macromolecule according to claim 1 wherein said macromolecule is chain stopped and wherein the chain extender is dimethylolpropionic acid and the initiator molecule is selected from the group consisting of ditrimethylolpropane, trimethylolpropane, ethoxylated pentaerythritol, pentaerythritol and glycerol.

9. A dendritic macromolecule according to claim 1 being a constituent in the preparation of a product selected from the group consisting of:
   a) an alkyd, an alkyd emulsion, a saturated polyester or an unsaturated polyester
   b) an epoxy resin
   c) a phenolic resin
   d) an amino resin
   e) a polyurethane resin, foam or elastomer
   f) a binder for radiation curing or powder systems
   g) an adhesive
   h) a synthetic lubricant
   i) a microlithographic paint
   j) a composite reinforced with glass, aramid or carbon/graphite fibres
   k) a moulding compound based on urea-formaldehyde resins, melamine-formaldehyde resins or phenol-formaldehyde resins
   l) a dental material.

10. A process of making a dendritic macromolecule according to claim 1 wherein said initiator molecule or initiator polymer is reacted with said chain extender at a temperature of 0°–300° C.

11. The process of according to claim 10 wherein said temperature is 100°–250° C.

12. The process of making a dendritic macromolecule according to claim 10 wherein a molar ratio between the chain extender and hydroxyl groups originating from the initiator molecule or the initiator polymer of 1:1 is 2000:1 is employed.

13. The process according to claim 12 wherein said molar ratio is 1:1 to 1100:1.

14. The process of making a dendritic macromolecule according to claim 10 wherein reaction water formed during the reaction is removed by means of inlet of an inert gas into the reaction vessel, by azeotropic distillation or by vacuum distillation.

15. The process according to claim 14 wherein said reaction water is continuously removed.

16. The process of making a dendritic macromolecule according to claim 10 wherein at least one esterification catalyst is present.

17. The process according to claim 16 wherein said catalyst is selected from the group consisting of:
   a) a Bronstedt acid
   b) a Lewis acid
   c) a titanate
   d) zinc powder or an organozinc compound
   e) tin powder or an organotin compound 18. The process according to claim 16 wherein said catalyst is selected from the group consisting of naphthalene sulphonic acid, p-toluene sulphonic acid, methane sulphonic acid, trifluoromethane sulphonic acid, trifluoroacetic acid, sulphuric acid, phosphoric acid, $BF_3$, $AlCl_3$, $SnCl_4$ and tetrabutyl titanate.

19. The process of making a dendritic macromolecule according to claim 10 wherein the central initiator molecule or initiator polymer is selected from the group consisting of:
   a) an aliphatic, a cycloaliphatic or an aromatic diol
   b) a triol
   c) a tetrol
   d) a sugar alcohol
   e) anhydroennea-heptitol or dipentaerythritol
   f) an α-alkylglucoside
   g) a monofunctional alcohol
   h) an alkoxylate polymer having a molecular weight of at most 8000 and being produced by reaction between an alkylene oxide thereof and one or more hydroxyl groups originating from compounds a) through g).

20. The process according to claim 19 wherein said initiator molecule is selected from the group consisting of ditrimethylolpropane, ditrimethylolethane, dipentaerythritol, pentaerythritol, alkoxylated pentaerythritol, trimethylolethane, trimethylolpropane, alkoxylated trimethylolpropane, glycerol, neopentyl glycol, dimethylolpropane, 1,3-dioxane-5,5-dimethanol, sorbitol, mannitol and α-methylglucoside.

21. The process of making a dendritic macromolecule according to claim 10 wherein the chain extender is selected from the group consisting of:
   a) a monofunctional carboxylic acid having at least two hydroxyl groups
   b) a monofunctional carboxylic acid having at least two hydroxyl groups wherein one or more of the hydroxyl groups are hydroxyalkyl substituted.

22. The process according to claim 1 wherein said chain extender is selected from the group consisting of dimethylolpropionic acid, α,α-bis(hydroxymethyl)-butyric acid, α,α,α-tris(hydroxymethyl)-acetic acid, α,α-bis(hydroxymethyl)valeric acid, α,α-bis(hydroxy)-pripionic acid and/or 3,5-dihydroxybenzoic acid.

23. The process of making a dendritic macromolecule according to claim 10 wherein said macromolecule is chain stopped and the chain stopper is selected from the group consisting of:
   a) a saturated monofunctional carboxylic acid or a saturated fatty acid or an anhydride thereof
   b) an unsaturated fatty acid
   c) an unsaturated monofunctional carboxylic acid
   d) a diisocyanate or an oligomer thereof
   e) an adduct of a reaction product a diisocyanate or an oligomer thereof
   f) a difunctional or a polyfunctional carboxylic acid or an anhydride thereof
   g) an adduct of a reaction product of a difunctional or a polyfunctional carboxylic acid or an anhydride thereof
   h) an aromatic monofunctional carboxylic acid
   i) an epihalohydrin
   j) a glycidyl ester of a monofunctional carboxylic acid or of a fatty acid, which acid has 1–24 carbon atoms
   k) an epoxide of an unsaturated fatty acid with 3–24 carbon atoms.

24. The process according to claim 23 wherein said chain stopper is selected from the group consisting of lauric acid, linseed fatty acid, soybean fatty acid, tall oil fatty acid, dehydrated castor fatty acid, capric acid, caprylic acid, trimethylolpropane diallyl ether maleate, metacrylic acid, acrylic acid, benzoic acid or para-tert. butylbenzoic acid, 1-chloro-2,3-epoxy propane, 1,4-dichloro-2,3-epoxy butane and epoxidized soybean fatty acid.

25. The process of making a dendritic macromolecule according to claim 10 wherein said macromolecule is chain stopped and wherein the chain extender is dimethylolpropionic acid and the initiator molecule is selected from the group consisting of ditrimethylolpropane, trimethylolpropane, ethoxylated pentaerythritol, pentaerythritol and glycerol.

* * * * *

UNITED STATES PATENT AND TRADEMARK OFFICE
CERTIFICATE OF CORRECTION

PATENT NO. : 5,418,301
DATED : May 23, 1995
INVENTOR(S) : Anders Hult, et al.

It is certified that error appears in the above-indentified patent and that said Letters Patent is hereby corrected as shown below:

```
        Column 1, line 8:    delete "composed of"
        Column 2, line 20:   delete "an"
        Column 9, lines 17 & 34:  "mpas"  should read
--mPas--
        Column 12, line 36:  "35°"  should read --35--
        Column 15, line 61:  "27,938.0"  should read
--27, 938.0--
        Column 18, line 18:  "27,242.0"  should read
--27, 242.0--
        Column 21, line 28:  "140"  should read --240--
        Column 23, line 2:   "mpas"  should read --mPas--
        Column 23, line 54:  "0,067"  should read --0.067--
        Column 23, line 55:  "0,045"  should read --0.045--
        Column 28, line 43, Claim 6:  after "product"  insert
--of a--
        Column 30, line 3:   delete "thereof"
        Column 30, line 37, Claim 23:  after "product"  insert
--of--
```

Signed and Sealed this

Eighteenth Day of June, 1996

Attest:

BRUCE LEHMAN

*Attesting Officer*          *Commissioner of Patents and Trademarks*